2,954,402
METHOD OF PRODUCING SUBSTITUTED BORAZOLES

Stanley F. Stafiej, Stamford, and Janet Hall Smalley, Norwalk, Conn., assignors to American Cyanamid Company, New York, N.Y., a corporation of Maine No Drawing. Filed Apr. 7, 1958, Ser. No. 726,641

8 Claims. (Cl. 260—551)

This invention relates to a method of producing certain compounds comprising boron and nitrogen, and more especially is concerned with a method of preparing a particular class of borazoles (also known as borazines). Still more particularly, the invention relates to a new and improved method of producing substituted borazoles represented by the general formula I 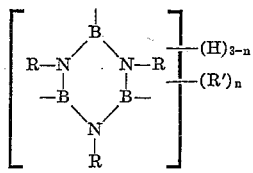

where R represents a member of the class consisting of hydrogen and hydrocarbon radicals, R' represents a hydrocarbon radical, and $n$ represents a number from 1 to 3, inclusive. The hydrocarbon radicals represented by R and R' can be the same or different. For example, all of the radicals represented by R can be the same, and all those represented by R' can be the same, but the latter being different from those represented by R; or some of the radicals represented by R' can be different from each other and from some or all of those represented by R, which latter can be the same or different. To the best of our knowledge and belief R and R' can be any hydrocarbon radical, that is, a radical composed solely of carbon and hydrogen.

Briefly described, the method of the present invention comprises effecting reaction between (A) a borazole represented by the general formula II 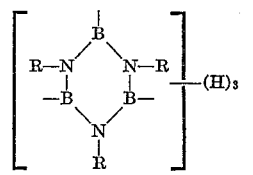

where R has the same meaning as given above with reference to Formula I, and (B) a compound represented by the general formula III $\qquad n\text{R}'\text{MgX}$ where $n$ and R' have the same meanings as given above with reference to Formula I, and X represents a halogen, more particularly chlorine, bromine or iodine. Grignard reagents embraced by Formula III wherein X represents fluorine are not precluded, especially those which either are presently known or could be made by known methods. The number of moles represented by $n$ in Formula III can be more than 3, in which case there is present a molecular excess of the compound embraced by R'MgX. When it is desired to substitute a hydrocarbon radical for each of the three hydrogen atoms attached to the boron atoms of the borazole ring, the compounds of (A) and (B) are employed in a molar ratio of 1 mole of the former to at least 3 moles of the latter, e.g., 3, 4, 5, 10 or any higher number of moles, the excess over 3 moles merely being excess Grignard reagent that is present in the reaction mass.

The present invention is based on our discovery that hydrogen atoms attached to boron atoms of a borazole ring are selectively reactive with a Grignard reagent so that an organic radical, more particularly a hydrocarbon radical, can be substituted therefor. In other words, the Grignard reagent reacts preferentially with the hydrogen attached to the aforesaid boron atoms rather than with the hydrogen attached to the aforesaid nitrogen atoms, the latter hydrogen either being non-reactive with the Grignard reagent or reacting at a much slower rate.

The reaction between the compounds of (A) and (B) is effected (as by contacting together) at a temperature of from about $-75°$ C. (more particularly from about $-15°$ C. to $+30°$ C.) up to the boiling temperature of the reaction mass but below the temperature of decomposition of the reactants and of the borazole reaction product represented by Formula I; for example, the upper temperature in the aforementioned range may be $+200°$ C., or even higher. In general, the temperature at which the reaction is effected is governed by the boiling points of the reactants. The reaction may be effected at atmospheric, sub-atmospheric or super-atmospheric pressure, and in the presence or absence of an essentially non-aqueous, more particularly anhydrous (substantially completely anhydrous), liquid medium which is inert during the reaction; that is, one which is inert (non-reactive) toward the reactants and the reaction product during the reaction period. By "substantially completely anhydrous" liquid medium is meant one which contains no more than a trace of water or the amount of water that might be present in the commercial product. Illustrative examples of such liquid media (solvents or diluents) are diethyl ether, di-n-propyl ether, di-n-butyl ether, dioxane, benzene, toluene and other aromatic hydrocarbons, normal and isomeric pentanes, hexanes, octanes, nonanes and other aliphatic hydrocarbons, chlorobenzene, etc.

When the number of moles of the compound R'MgX (Formula III), which number is represented by $n$ in that formula, is less than 3, then the reaction of the said compound with the B-trihydrogenborazole (B,B',B"-trihydrogenborazole) embraced by Formula II results in partial substitution of hydrogen atoms by hydrocarbon radicals (R') on the borazole ring, giving the B-monohydrocarbon-B',B"-dihydrogenborazoles and B,B'-dihydrocarbon-B"-monohydrogenborazoles as the main products. Some B,B',B"-trihydrocarbon-substituted borazole may also be formed and be present in the reaction mass, the amount thereof (in general) being the greater the more closely the number of moles of the compound represented by R'MgX approaches 3.

For certain purposes the reaction mass containing the borazole reaction product can be used as such (e.g., in making other substituted borazoles) without isolating therefrom the borazole reaction product of the method. This practice often is advantageous when the substituted borazole of the method is one having an average of appreciably less than 3 (e.g., from ½ to 2½) unsubstituted hydrogen atoms attached to boron (so-called "B—H" atoms) per borazole ring present in the product, and the isolation of which is unnecessary in making the desired ultimate product. In other cases, more particularly when there are no unsubstituted B—H atoms attached to the borazole ring, the borazole reaction product is preferably isolated from the reaction mass, e.g., by first decomposing any unreacted Grignard reagent (as, for instance, by treating the reaction mass with a dilute aqueous solution of HCl or other acid; or with an alcohol, e.g., anhydrous ethyl alcohol; or, preferably, with a saturated aqueous solution of ammonium chloride to give an anhydrous solution of the substituted borazole; as well as by other means). The aqueous phase is then separated from the organic phase after first collecting, as by filtration, any solid, suspended borazole reaction product that may be present in either or both of these phases; washing the organic phase with water or a mixture of water and alcohol to remove salts; and recovering all of the remaining borazole reaction product from the organic phase by distillation, crystallization or other suitable means.

Instead of the saturated aqueous solution of ammonium chloride mentioned above, one can use a saturated aqueous solution of an acidic ammonium salt of any other acid having a pK value of less than 4.75. Additional examples of such salts are ammonium sulfate, ammonium nitrate, ammonium bromide, ammonium chlorate, ammonium perchlorate, ammonium tartrate, ammonium sulfite, ammonium bromoacetate, ammonium alpha-bromopropionate, ammonium dichloracetate, ammonium formate, ammonium fumarate, ammonium phosphate, ammonium dihydrogen phosphate, ammonium pyrophosphate and ammonium trichloroacetate.

Some of the substituted borazoles produced by the method of the present invention are new, while others are old.

Illustrative examples of hydrocarbon radicals represented by R and R′, where they appear in the above formulas, are alkyl (including cycloalkyl), alkenyl (including cycloalkenyl), aralkyl, aralkenyl, aryl, alkaryl and alkenylaryl. More specific examples of such radicals are methyl, ethyl, propyl, isopropyl, butyl, isobutyl, sec.-butyl, amyl, isoamyl, hexyl to tetracontyl, inclusive (both normal and isomeric forms), cyclopentyl, cyclopentenyl, cyclohexyl, cyclohexenyl, cycloheptyl, etc.; benzyl, phenylethyl, phenylpropyl, phenylisopropyl, phenylallyl, fluorenyl, dinaphthylenemethyl, etc.; phenyl, biphenylyl or xenyl, naphthyl, fenchyl, phenanthryl, benzonaphthyl, anthryl, naphthyl-substituted anthryl, dianthryl and fluorenyl, etc.; tolyl, xylyl, ethylphenyl, propylphenyl, isopropylphenyl, butylphenyl, allylphenyl, etc.; and vinyl, allyl, methallyl, propenyl, isopropenyl (beta-allyl), 1-butenyl, 2-butenyl (crotyl), 3-butenyl, pentenyl, hexenyl, butadienyl, etc.

Specific examples of compounds embraced by the formula R′MgX where R′ and X have the same meanings given above, that can be reacted in accordance with the present invention with a B—H borazole of the kind embraced by Formula II, are given in Kharasch and Reinmuth's Grignard Reactions of Nonmetallic Substances, Prentice-Hall, Inc., New York, N.Y. (1954), and in the references cited therein. A convenient index of Grignard reagents, including those embraced by Formula III, is given (on the basis of empirical formulas) on pages 1348–1362 of this publication. In this index and throughout the book are numerous examples of Grignard reagents wherein the organic grouping attached to Mg is other than a hydrocarbon radical and which likewise might be used in producing substituted borazoles (many of which are new) in accordance with the general principles of the present invention.

Borazoles having aryl, alkyl and halogen substituents attached to the borazole ring are known. The better known compounds are those which are symmetrically substituted. Some of the synthetic routes by which they are obtained are outlined below:

IV 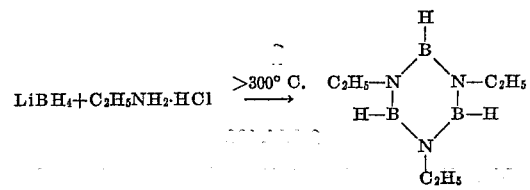

V 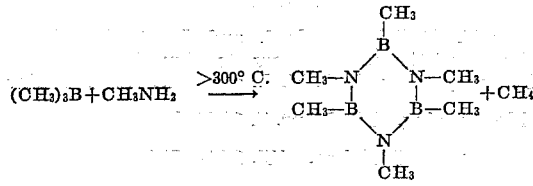

VI 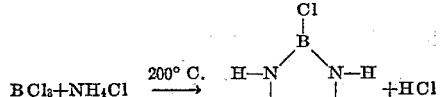

VII 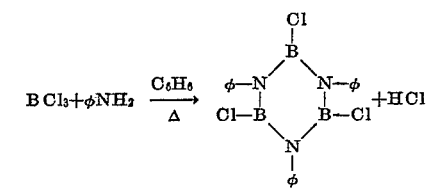

VIII 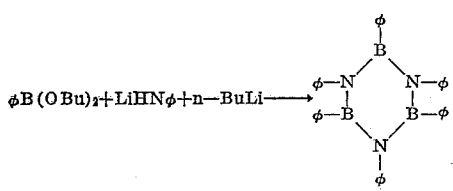

In the above formulas the symbol $\phi$ means $C_6H_5$.

All of the above methods share one common feature, viz.: substituents are "built onto" the borazole ring by a proper choice of the starting material. In many cases the prior methods have utilized vacuum-chain techniques, and the quantities of materials that could be produced were necessarily limited.

Halogenoborazoles are now known (see, for example, U.S. Patent No. 2,754,177, dated July 10, 1956), which fact has aided in advancing the art. The halogenoborazoles can be prepared as illustrated by the following equation in which, for purpose of simplicity only, borazole itself is shown as a starting reactant with 3 moles of a hydrogen halide (HX) to yield a trihalogenoborazole:

IX 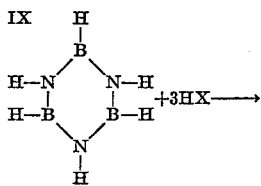

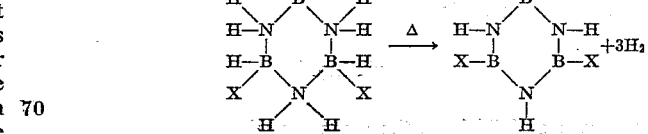

The B—H borazoles used in practicing the present invention can be prepared, for example, through reduction of the corresponding B—Cl borazoles by $NaBH_4$ in, for instance, polyethylene glycol ethers; or $LiBH_4$ in di-n- butyl ether; or by NaHB(OCH$_3$)$_3$. Another method is by reacting LiBH$_4$ with ammonium chloride or a hydrocarbon-substituted primary amine hydrochloride in ether, and pyrolyzing the reaction product.

The present invention provides a new and improved method of producing substituted borazoles, both symmetrical and unsymmetrical in good yield and of high purity; and provides a less costly method than the prior methods of producing borazoles of the kind embraced by Formula I in sizeable quantities and without the use of special equipment, as well as the production of new and useful borazoles.

In order that those skilled in the art may better understand how the present invention can be carried into effect, the following examples are given by way of illustration and not by way of limitation. All parts and percentages are by weight unless otherwise stated. Although not essential to the operativeness of the process of the present invention, the examples pertinent to the invention which follow are carried out in an atmosphere of an inert gas, specifically nitrogen, since this is conducive to the obtainment of somewhat higher yields.

EXAMPLE 1

*Preparation of B-triphenyl-N-trimethylborazole*

Phenyl magnesium bromide is prepared in the usual manner from 14.9 g. (0.095 mole) of bromobenzene and 2.3 g. (0.095 g. atom) of magnesium turnings in a total volume of 200 cc. anhydrous ether (diethyl ether). The Grignard reagent is added dropwise over a ½-hour period to a stirred solution of 3.68 g. (0.03 mole) of N,N',N''-trimethylborazole (N-trimethylborazole), B.P. 132° C., in 100 cc. anhydrous ether. During the course of the addition some solid separates from the solution. After addition is complete, the reaction mixture is refluxed for two hours and then allowed to stand for about 16 hours at room temperature (20°–30° C.). By the end of this time a considerable amount of solid has separated from the solution. The solvent is stripped off at reduced pressure and the solid residue is refluxed with n-hexane (500 cc.) for one hour, with some solid remaining insoluble. The solution is filtered several times to remove the cloudiness. The clear but slightly yellow solution is then concentrated and cooled to give B-triphenyl-N-trimethylborazole (B,B',B''-triphenyl-N,N',N''-trimethylborazole) in two crops. Wgt. 6.38 g., M.P. 267°–269° C. Yield: 61%. This material is identical with that prepared from B-trichloro-N-trimethylborazole and phenyl magnesium bromide which analyzes as follows: C, 71.86; H, 6.87; N, 11.54; B, 8.81. The calculated values are: C, 71.88; H, 6.89; N, 11.97; and B, 9.25. The above numerical values are percentages.

EXAMPLE 2

*Preparation of B-tri-p-tolyl-N-tri-(cyclohexyl)borazole*

The subject compound is obtained in a yield above 50% of the theoretical by reacting 0.095 mole of p-tolyl magnesium bromide with 0.024 mole of N-tri-(cyclohexyl)borazole following essentially the same procedure described under Example 1 with reference to the preparation of B-triphenyl-N-trimethylborazole.

EXAMPLE 3

*Preparation of B-trioctadecyl-N-tri-n-propylborazole*

Using 0.08 mole of octadecyl magnesium bromide and 0.02 mole of N-tri-n-propylborazole, essentially the same procedure is followed in making B-trioctadecyl-N-tri-n-propylborazole as is described under Example 1 with reference to the preparation of B-triphenyl-N-trimethylborazole.

EXAMPLE 4

*Preparation of hexamethylborazole*

An ether solution of methyl magnesium iodide is prepared in the usual way from methyl iodide (13.5 g.; 0.095 mole) and magnesium turnings (2.3 g.; 0.095 mole) in 100 ml. anhydrous ether and then added to a stirred solution of N-trimethylborazole (3.68 g.; 0.03 mole) in 50 cc. of ether over a ½-hour period. The gray, cloudy reaction mixture is stirred at room temperature for one hour and then left standing for about 16 hours at room temperature without stirring. At the end of this time, the reaction mass has separated into two phases: a lower, black, viscous layer and an upper, clear, colorless, ether solution. After cooling the reaction mass in an ice-water bath, a saturated aqueous solution of ammonium chloride is added dropwise with stirring to the point at which the inorganic salts separate rapidly from solution. The yellow-orange colored ether solution is decanted and the insoluble salts are washed several times with fresh portions of ether. The combined ether solution and washings are dried over anhydrous MgSO$_4$ (drying agent) for two hours. After filtering off the drying agent, the ether solution is evaporated to dryness, leaving a fluffy, white residue of impure hexamethylborazole which is purified by sublimation at 60°–70° C. and 0.3 mm. pressure. Yield: 4.1 g. (83%) of material that is identical to hexamethylborazole prepared from B-trichloro-N-trimethylborazole and which has the following analysis: C, 43.39%; H, 10.83%; N, 25.43%; B, 19.91%. Calculated: C, 43.76%; H, 11.00%; N, 25.52%; B, 19.71%.

EXAMPLE 5

*Preparation of B-tribenzyl-N-triallylborazole*

B - tribenzyl - N - triallylborazole (B',B'',B'''-tribenzyl-N,N',N''-triallylborazole) is prepared from 0.075 mole of benzyl magnesium chloride and 0.021 mole of N-triallylborazole following essentially the same procedure described under Example 4 with reference to the preparation of hexamethylborazole. It is more convenient, however, to purify the impure B-tribenzyl-N-triallylborazole by recrystallization from a suitable solvent, e.g., an ether-methanol mixture, rather than by sublimation as described under Example 4.

EXAMPLE 6

*Preparation of B-triethyl-N-tri-p-tolylborazole*

Using 0.096 mole of ethyl magnesium bromide and 0.024 mole of N-tri-p-tolylborazole, essentially the same procedure is followed in making B-triethyl-N-tri-p-tolylborazole as is described under Example 5 with reference to the preparation of B-tribenzyl-N-triallylborazole.

EXAMPLE 7

*Preparation of B-trimethyl-N-triphenylborazole*

Methyl magnesium iodide is prepared in the usual manner from magnesium turnings (2.1 g.; 0.085 mole) and methyl iodide (10.65 g.; 0.075 mole) in 75 ml. of anhydrous diethyl ether and added dropwise to a stirred suspension of N-triphenylborazole (6.2 g.; 0.02 mole) in 50 ml. of ether. The reaction mixture is stirred for one hour after the addition of the Grignard reagent and then titrated with a saturated aqueous solution of ammonium chloride to the point at which the magnesium salts settle rapidly from the stirred solution. Anhydrous magnesium sulfate is then added to the reaction mass, after which it is allowed to stand for about 16 hours at room temperature. The reaction mass is then diluted with 100 ml. ether, filtered, and the precipitate washed with three 50-ml. portions of fresh ether. The washings are added to the filtrate. Concentration of the ether solution gives two crops of crystals, M.P. 269°–272° C., weight 5.4 g.; 77% yield, identical to authentic B-trimethyl-N-triphenylborazole prepared from B-trichloro-N-triphenylborazole and methyl magnesium iodide.

N-triphenylborazole (N,N',N''-triphenylborazole) can be prepared, for instance, as broadly and specifically described in the copending application of Stanley F. Stafiej and Stephen J. Groszos, Serial No. 726,634, filed concurrently herewith, now Patent No. 2,945,882, dated July 19, 1960, a detailed procedure being as follows:

A suspension of B,B',B''-trichloro - N,N',N''-triphenylborazole (27.7 g.; 0.067 mole) in 150 ml. anhydrous ether is added in small portions over a period of ½ hour to a suspension of lithium aluminum hydride (5.0 g., 0.13 mole) in 200 ml. anhydrous ether. The mixture is stirred for 22 hours at room temperature (20°–30° C.) after the addition has been completed. At the end of this period of time, the reaction mass consists of a gray solid (presumably a mixture of LiCl and AlCl$_3$) suspended in a colorless ether solution containing the N-triphenylborazole dissolved therein. Saturated aqueous ammonium chloride solution is added dropwise with cooling and rapid stirring to the point at which a gray solid settles rapidly from the clear, colorless, ether solution, which is decanted and filtered through anhydrous sodium sulfate. The ether solution is evaporated to dryness at room temperature and aspirator pressure. The colorless, partly crystalline residue is refluxed with dry n-hexane for 45 minutes, and the small amount of insoluble material present therein is removed by filtration. After concentrating the filtrate to about 100 ml. and cooling, the product separates in 13.3 g. yield (64% of the theoretical) as nicely formed prisms; M.P. 154°–157° C. Two recrystallizations from n-hexane provide an analytical sample; M.P., 158°–160° C.

| | Percent C | Percent H | Percent N | Percent B |
|---|---|---|---|---|
| Analysis calculated for C$_{18}$H$_{18}$N$_3$B$_3$ | 70.01 | 5.87 | 13.61 | 10.51 |
| Found | 69.77 | 6.07 | 13.43 | 10.29 |

EXAMPLE 8
*Preparation of B-triallyl-N-triphenylborazole*

B-triallyl-N-triphenylborazole is prepared by reacting 0.092 mole of allyl magnesium bromide with 0.027 mole of N-triphenylborazole, following essentially the procedure described under Example 7 with reference to the preparation of B-trimethyl-N-triphenylborazole. Purification of the subject compound is more conveniently achieved by recrystallizing from an ether-methanol mixture rather than from ether alone.

EXAMPLE 9
*Preparation of B-trivinyl-N-triphenylborazole*

Using 0.042 mole of vinyl magnesium bromide and 0.013 mole of N-triphenylborazole, essentially the same procedure is followed in making B-trivinyl-N-triphenyl borazole as is described under Example 1 with reference to the preparation of B-triphenyl-N-trimethylborazole, except that the vinyl magnesium bromide is prepared in tetrahydrofuran solution rather than in diethyl ether solution.

EXAMPLE 10
*Preparation of hexaphenylborazole*

Phenyl magnesium bromide is prepared in the usual way from magnesium turnings (2.1 g.; 0.085 mole) and bromobenzene (11.8 g.; 0.075 mole) in ether (100 ml.).

N-triphenylborazole (6.2 g.; 0.02 mole) in 100 ml. dry ether is added to the stirred Grignard solution over a ½-hour period and the mixture is refluxed for 1½ hours. After being titrated with a saturated aqueous solution of NH$_4$Cl (as described in previous examples) the ether solution is decanted and the insoluble precipitate is dried by passing a stream of dry nitrogen over the surface. The ether solution is evaporated to dryness and the residue added to the original precipitate. The combined solid material is then extracted with chloroform in a Soxhlet apparatus for 24 hours. Concentration of the chloroform solution gives 8.2 g. (76.6% yield) of colorless, crystalline hexaphenylborazole, which is identical by infrared comparison with authentic material of M.P. 413° C.

EXAMPLE 11
*Preparation of B-tri-(cyclohexyl)-N-trinaphthylborazole*

B-tri-(cyclohexyl)-N-trinaphthylborazole is made by reacting 0.096 mole of cyclohexyl magnesium bromide with 0.024 mole of N-trinaphthylborazole following essentially the same procedure described under Example 10 with reference to the preparation of hexaphenylborazole.

EXAMPLE 12
*Preparation of B-monomethyl-N-triphenylborazole*

N-triphenylborazole (21.6 g.; 0.07 mole) is pulverized and added to 300 ml. of ether in a three-necked, one-liter, round-bottomed flask, which is fitted with a stirrer, reflux condenser, and a Claisen head containing a nitrogen-inlet tube and a dropping funnel. A solution of methyl magnesium iodide (0.077 mole of CH$_3$MgI) in 70 ml. of ether is added dropwise over a one-hour period to the stirred solution. During this time, an oil slowly separates from solution. The reaction mass is stirred at room temperature for another two hours and then titrated with a saturated aqueous solution of ammonium chloride as described in previous examples. The clear, colorless, ether solution is decanted and the residue washed with four 25 ml. portions of fresh ether. The combined ether solution and washings are evaporated to dryness. Recrystallization from hexane yields 20.6 g. of B-monomethyl-N-triphenylborazole (91% yield) of M.P. 137°–141° C. Several recrystallizations from petroleum ether (B.P. 30°–60° C.) furnish the analytical sample of M.P. 140°–142° C.

Analysis calc'd for C$_{19}$H$_{20}$N$_3$B$_3$: C, 70.68%; H, 6.24%; N, 13.02%; B, 10.05%. Found: C, 70.62%; H, 6.35%; N, 12.60%; B, 10.38%.

EXAMPLE 13
*Preparation of B-dimethyl-N-triphenylborazole*

To a solution of N-triphenylborazole (7.4 g.; 0.024 mole) in 100 ml. ether is added a solution of methyl magnesium iodide (0.048 mole) in 150 ml. of ether as described in Example 12. After all the Grignard solution has been added, the mixture is stirred at room temperature for one hour and then titrated with a saturated aqueous solution of ammonium chloride, as described in previous examples. Anhydrous magnesium sulfate (3 g.) is added to the reaction mass, which is allowed to stand for about 16 hours. Solvent is removed under reduced pressure and the solid residue is extracted with hot hexane. From the filtered and concentrated hexane solution there is obtained 6.8 g. (85% yield) of crystalline material comprising B-dimethyl-N-triphenylborazole with M.P. 196°–197° C. The melting point of a sample recrystallized several times from hexane is 202°–204° C.

Analysis calc'd for C$_{20}$H$_{22}$N$_3$B$_3$: C, 71.31%; H, 6.58%; N, 12.47%; B, 9.63%. Found: C, 71.17%; H, 6.18%; N, 12.87%; B, 9.72%.

EXAMPLE 14
*Preparation of B,N,N',N''-tetraphenylborazole*

Phenyl magnesium bromide (0.019 mole) in 52 ml. of ether is added dropwise to a stirred slurry of N-triphenylborazole (5.9 g.; 0.019 mole) in 75 ml. dry ether over a 15-minute period. The reaction mixture is stirred for about 16 hours at room temperature and titrated with a saturated aqueous ammonium chloride solution, as described in previous examples. The ether solution is decanted and the solid residue is washed with several portions of fresh ether. The combined ether solution and washings are then concentrated and cooled to give, in two crops, 4.65 g. (64% yield) of B,N,N',N''-tetraphenylborazole, M.P. 214°–217° C. A sample recrystallized several times from chloroform has M.P 214°–215° C.

Analysis calc'd for C$_{24}$H$_{22}$N$_3$B$_3$: C, 74.89%; H, 5.76%; N, 10.92%; B, 8.43%. Found: C, 74.54%; H, 5.86%; N, 11.07%; B, 8.40%.

EXAMPLE 15

*Preparation of B,B′,N,N′,N″-pentaphenylborazole*

Phenyl magnesium bromide (0.053 mole) in 109 ml. of diethyl ether is added dropwise over a ½-hour period to a stirred slurry of N-triphenylborazole (7.4 g.; 0.024 mole) in 100 ml. ether, and the reaction mixture is stirred for about 16 hours at room temperature. The reaction mass is then titrated with a saturated aqueous ammonium chloride solution as described in the previous examples. Anhydrous magnesium sulfate is added and the solution is stirred 15 minutes longer. Chloroform is added and the organic solution is decanted from the solid residue. After washing this residue with several portions of chloroform, the combined chloroform solution and washings are concentrated to a volume of 75 ml. and set aside to cool. B,B′,N,N′,N″-pentaphenylborazole separates from the solution as colorless crystals. Wgt. 5.4 g., M.P. 200°–202° C. A second crop, wgt. 3.1 g., M.P. 194°–201° C. is obtained from the mother liquor. Total yield: 77% of the theoretical. The purified sample, after several recrystallizations from chloroform, has M.P. 203°–205° C.

The substituted borazoles produced by the method of this invention range from liquids to semi-solids and solids in normal state. They are useful, for instance, as components of flame-resisting compositions; as plasticizers; as fuel additives; as scintillation counters; as the active ingredient in insecticides, bactericides, germicides, fungicides, pesticides and the like; as a chemical intermediate for use in the preparation of other compounds; as a component of arc-extinguishing tubes, and especially of surfaces that are exposed to the action of the arc. Other uses include: as rocket fuels or as components of such fuels; as polymer additives to impart neutron-absorbing properties to the polymer to which it is added and to improve the thermal stability of the polymer; as heat-exchange media or as modifiers of such media whereby they can be used at higher temperatures; as petroleum additives which are hydrolytically stable (e.g., viscosity-index improvers, lubricants and greases for high-temperature applications, cetane improvers, ignition promoters, anti-knock agents, preventives of pre-ignition, etc.); and in making new types of dyes and pigments. Some of them, for instance those containing reactive hydrogen or polymerizable groups, are also useful as cross-linking agents in resinous compositions.

The homopolymerizable and/or copolymerizable substituted borazoles produced by the method of this invention can be employed alone or in combination with other substances that are copolymerizable therewith to yield new synthetic materials (homopolymers and copolymers) having particular utility in the plastics and coating arts. The following examples illustrate more specifically the utility of substituted borazoles produced in accordance with the present invention.

EXAMPLE 16

Ten (10) parts of B,B′,B″-triallyl-N,N′,N″-triphenylborazole is dissolved in 90 parts of benzene (in which it is very soluble), and about 0.3 part of a 75% solution of pinane hydroperoxide in pinane is added thereto. The mixture is agitated to obtain a homogeneous solution, after which a portion is cast on a glass plate. The coated plate is placed in an oven maintained at about 150° C. After about 6 hours at this temperature homopolymerization of the monomer is evident. The resulting film of polymer is insoluble in benzene, which is a good solvent for the monomer. The film is effective against both slow and fast neutrons but especially against slow neutrons, and may be adhesively bonded or otherwise united to polymeric methyl methacrylate or other plastic material, concrete, or other substrates suitable for this purpose.

EXAMPLE 17

|  | Parts | Approx. Weight, Percent | Approx. Molar (Mole), Percent |
|---|---|---|---|
| B-trivinyl-N-triphenylborazole | 37.8 | 79.4 | 50.0 |
| Methyl methacrylate | 9.8 | 20.6 | 50.0 | are dissolved in 111 parts of chlorobenzene together with 0.6 part of a free-radical polymerization catalyst, specifically alpha,alpha′-azodiisobutyronitrile. The mixture is placed in a heavy-walled glass tube, which is thoroughly deaerated, sealed under vacuum, and placed in a 70° C. bath. After 1½ hours at this temperature, the tube is cooled and the reaction mass is added to 500 ml. methanol to precipitate the copolymer of B-trivinyl-N-triphenylborazole and methyl methacrylate.

The product is collected by filtration, and after drying gives 22 parts (46% yield) of material in the form of a white powder. Analysis of this copolymer shows 8.22% nitrogen, representing 44 mole percent of B-trivinyl-N-triphenylborazole. This copolymer softens at ca. 155° C. but is not completely liquefied even up to 200° C. It forms clear, somewhat brittle films. The copolymer is soluble in chloroform and benzene.

The films are useful in applications such as mentioned under Example 16 with reference to films of homopolymers of B,B′,B″-triallyl-N,N′,N″-triphenylborazole (B-triallyl-N-triphenylborazole).

Unsaturated borazoles of the kind employed in Examples 16 and 17 are believed to be new chemical compounds.

EXAMPLE 18

Hexamethylborazole in finely divided state is suspended in a viscous polymer obtained by incompletely polymerizing methyl methacrylate monomer. The resulting suspension is cast between glass plates to form a 3/16-inch sheet and is then hardened by heating at about 70°–80° C. The resulting sheet has a hexamethylborazole concentration, calculated as boron, of about 0.3 g. boron per sq. cm. of shield surface and is effective in reducing the intensity of a beam of thermal neutrons.

Instead of hexamethylborazole in the foregoing example, one can use, with varying degrees of effectiveness, any of the other substituted borazoles produced by the method of the present invention, and especially when the amount thereof calculated as boron provides a concentration of boron ranging from 0.1 g. to 0.5 g. boron per sq. cm. of shield surface.

In any of the aforementioned and other applications or uses, one can employ a single compound of the kind embraced by Formula I or a plurality of such compounds in any proportions. They can be used in conjunction with any of the conventional components of flame-resisting compositions, plasticizers, insecticides, bactericides, germicides, fungicides, pesticides, and other compositions hereinbefore mentioned by way of illustrating the fields of utility, generically and specifically, of the substituted borazoles produced by the method of this invention.

We claim:

1. A method of producing borazoles represented by the general formula

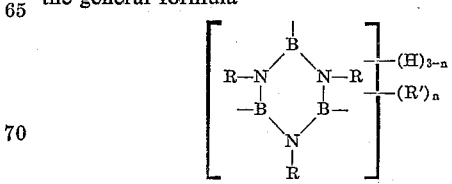

where R represents a member of the class consisting of hydrogen and hydrocarbon radicals, R′ represents a hydrocarbon radical, and n represents a number from 1 to 3, inclusive, said method comprising effecting reaction between ingredients consisting essentially of (A) a borazole represented by the general formula

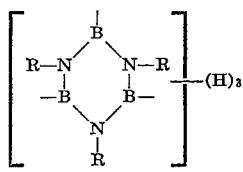

where R has the same meaning as given above and (B) a compound represented by the general formula

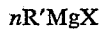

where $n$ and R' have the same meanings as given above, and X represents a halogen, the reaction between the compounds of (A) and (B) being effected under substantially completely anhydrous conditions and at a temperature of from about $-75°$ C. up to the boiling temperature of the reaction mass but below the temperature of decomposition of the reactants and of the borazole reaction product represented by the above formula.

2. A method as in claim 1 wherein $n$ represents 3.

3. A method as in claim 1 wherein the reaction between the compounds of (A) and (B) is effected in the presence of an inert, substantially completely anhydrous, liquid medium.

4. A method of producing borazoles represented by the general formula

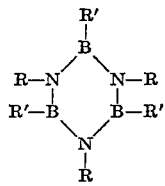

where R represents a member of the class consisting of hydrogen and hydrocarbon radicals, and R' represents a hydrocarbon radical, said method comprising effecting reaction between ingredients consisting essentially of (A) a borazole represented by the general formula

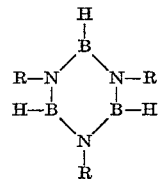

where R has the same meaning as given above and (B) a compound represented by the general formula

where R' has the same meaning as given above, and X represents a halogen, the compounds of (A) and (B) being employed in a molar ratio of 1 mole of the former to at least 3 moles of the latter and the reaction between the said compounds being effected under substantially completely anhydrous conditions and at a temperature of from about $-75°$ C. up to the boiling temperature of the reaction mass but below the temperature of decomposition of the reactants and of the borazole reaction product represented by the above formula; and isolating from the resulting reaction mass a borazole embraced by the first-given formula.

5. A method of preparing hexaphenylborazole which comprises effecting reaction in a substantially completely anhydrous liquid medium and at a temperature ranging between about 20° C. and the reflux temperature of the reaction mass, between ingredients consisting essentially of (1) N-triphenylborazole and (2) phenyl magnesium bromide, the compounds of (1) and (2) being employed in a molar ratio of 1 mole of the former to at least 3 moles of the latter; and isolating hexaphenylborazole from the resulting mass.

6. A method of preparing B-triphenyl-N-trimethylborazole which comprises effecting reaction in a substantially completely anhydrous liquid medium, and at a temperature ranging between about 20° C. and the reflux temperature of the reaction mass, between ingredients consisting essentially of (1) N-trimethylborazole and (2) phenyl magnesium bromide, the compounds of (1) and (2) being employed in a molar ratio of 1 mole of the former to at least 3 moles of the latter; and isolating B-triphenyl-N-trimethylborazole from the resulting reaction mass.

7. A method of preparing hexamethylborazole which comprises effecting reaction in a substantially completely anhydrous liquid medium, and at a temperature ranging between about 20° C. and the reflux temperature of the reaction mass, between ingredients consisting essentially of (1) N-trimethylborazole and (2) methyl magnesium iodide, the compounds of (1) and (2) being employed in a molar ratio of 1 mole of the former to at least 3 moles of the latter; and isolating hexamethylborazole from the resulting reaction mass.

8. A method of preparing B-trimethyl-N-triphenylborazole which comprises effecting reaction in a substantially completely anhydrous liquid medium, and at a temperature ranging between about 20° C. and the reflux temperature of the reaction mass, between ingredients consisting essentially of (1) N-triphenylborazole and (2) methyl magnesium iodide, the compounds of (1) and (2) being employed in a molar ratio of 1 mole of the former to at least 3 moles of the latter; and isolating B-trimethyl-N-triphenylborazole from the resulting reaction mass.

No references cited.